United States Patent [19]
Levely

[11] Patent Number: 5,516,177
[45] Date of Patent: May 14, 1996

[54] INSTRUMENT PANEL GLOVE BOX DOOR ASSEMBLY

[75] Inventor: David M. Levely, Wyandotte, Mich.

[73] Assignee: Ford Motor Company, Dearborn, Mich.

[21] Appl. No.: 163,637

[22] Filed: Jan. 28, 1994

[51] Int. Cl.⁶ ........................................................ B60R 7/06
[52] U.S. Cl. ............................................ 296/37.12; 16/85
[58] Field of Search ............................ 296/37.12; 16/82, 16/85, 49

[56] References Cited

U.S. PATENT DOCUMENTS

| | | |
|---|---|---|
| 210,361 | 11/1878 | Rhodes . |
| 284,008 | 8/1883 | Hass . |
| 431,349 | 7/1890 | Hart . |
| 653,018 | 7/1900 | Clum . |
| 2,586,757 | 2/1952 | Wummel et al. . |
| 2,883,234 | 4/1959 | Biondo . |
| 3,201,820 | 8/1965 | Derosiers . |
| 3,602,942 | 9/1971 | Neff et al. . |
| 4,239,277 | 12/1980 | Oda ........................................ 296/37.12 |
| 4,259,762 | 4/1981 | Civitelli ................................... 16/85 X |
| 4,786,098 | 11/1988 | Jobmann et al. ....................... 296/37.12 |
| 5,275,456 | 1/1994 | Ishii et al. .............................. 296/37.12 |

FOREIGN PATENT DOCUMENTS 7279  2/1956  Germany .

*Primary Examiner*—Joseph D. Pape
*Attorney, Agent, or Firm*—Daniel M. Stock; Roger L. May

[57] ABSTRACT

An improved glove box door assembly includes a resilient U-shaped clip member that operatively engages a piano hinge mounted on an instrument panel reinforcing member adjacent the lower edge of the door to damp movement of the door in the opening direction of the door with respect to the instrument panel.

11 Claims, 3 Drawing Sheets

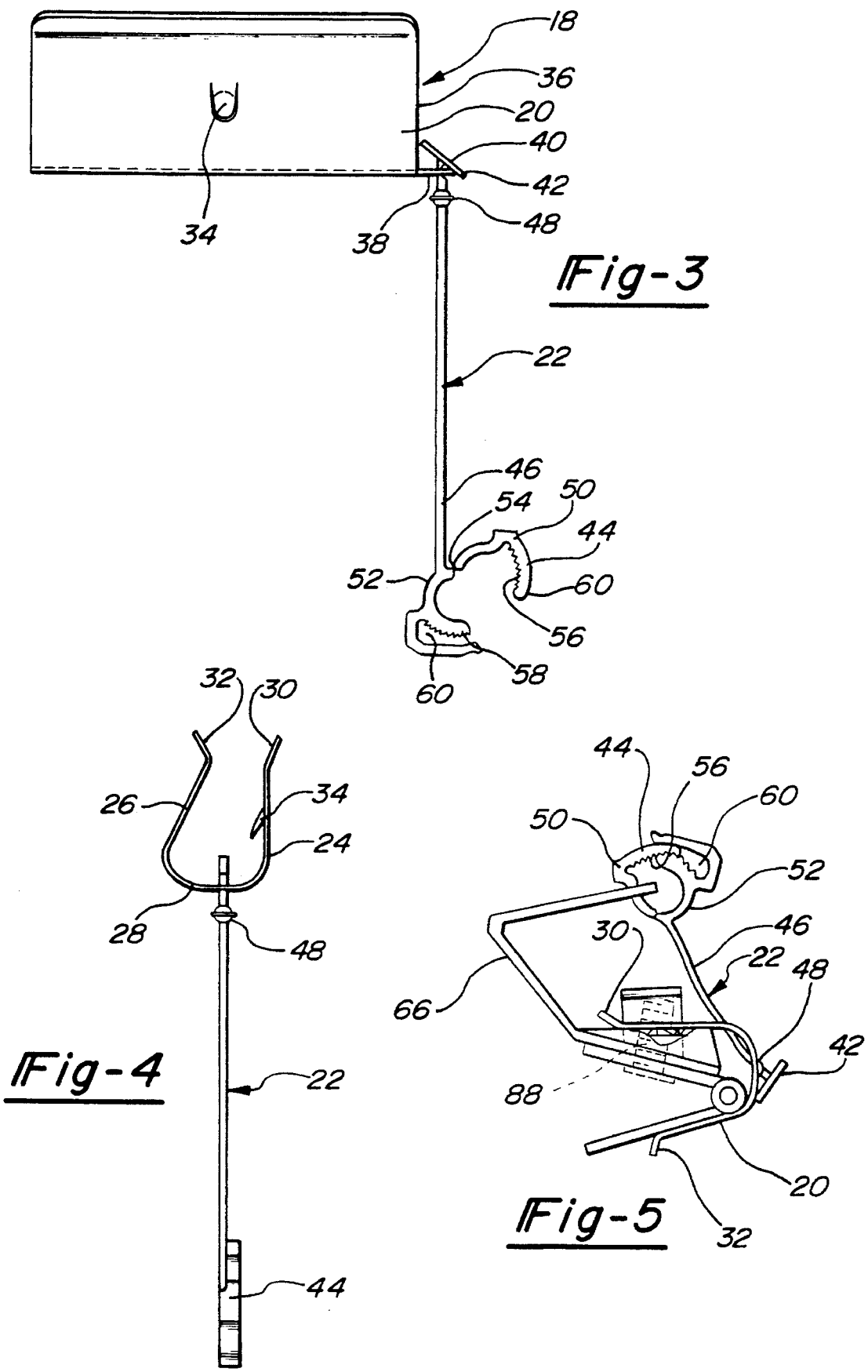

5,516,177

INSTRUMENT PANEL GLOVE BOX DOOR ASSEMBLY

BACKGROUND OF THE INVENTION

1. Technical Field

The invention relates generally to automotive instrument panels, and more specifically to glove box door constructions for such panels.

2. Description of the Prior Art

It is common in the construction of automotive instrument panels to provide for a pivotally mounted door in the instrument panel to control access to a storage compartment, commonly referred to as a glove box. It is typical for such doors to present a generally vertical planar surface to the interior of the vehicle and to be hinged along the bottom edge to permit pivotal movement between open and closed positions. While most such glove box doors are mounted in a pivotally free fashion, it is known to use devices which control the hinged movement such as the torsion spring device shown in U.S. Pat. No. 2,883,234 to Biondo. Such devices assist in retaining the glove compartment door in its closed position and reduce the force necessary to effect closure.

More recent automotive vehicle designs, however, have presented a new problem in controlling glove box door movement. Many modern glove box doors function as a bolster arranged in juxtaposition with the knees of a passenger within the passenger compartment of the vehicle. Constructing the door as a bolster necessarily results in a more massive design than was heretofore encountered. It is accordingly desirable to modify the hinged movement of the door in a fashion that will result in slower movement of the massive design than would be possible in a freely pivoting arrangement. A present common approach to controlling this movement is through the use of hydropneumatic snubbers interposed between the door and the instrument panel. The additional cost, weight, and complexity of this approach makes it inappropriate in certain vehicle applications.

It is accordingly desired that the problem of modifying the pivotal motion of a glove box door with respect to an instrument panel be carried out in an inexpensive and effective manner.

SUMMARY OF THE INVENTION

The desired result is accomplished in the present invention by the provision of an instrument panel in which a glove box door assembly is mounted through a hinge to the instrument panel for pivotal movement between open and closed positions, and wherein a simple U-shaped clamp is provided to clampingly engage the hinge and the instrument panel to resiliently resist movement of the glove box door toward the open position.

According to another aspect of the invention, the simple U-shaped clip member is tethered to the instrument panel to facilitate handling of the instrument panel and glove box door assembly during operation of the automotive assembly plant in which the vehicle utilizing the instrument panel assembly is built.

BRIEF DESCRIPTION OF THE DRAWINGS

These and other objects and features of the present invention will be apparent to those skilled in the automotive body art upon reading the following description with reference to the accompanying drawing, in which:

FIG. 3 is a front elevational view of the clip of FIG. 2 with a tether installed;

FIG. 4 is a side view of the clip and tether of FIG. 3;

FIG. 5 is a partial cross-section view illustrating the clip of FIGS. 2–4 in the operative open position;

DESCRIPTION OF THE PREFERRED EMBODIMENTS

Figure 1:
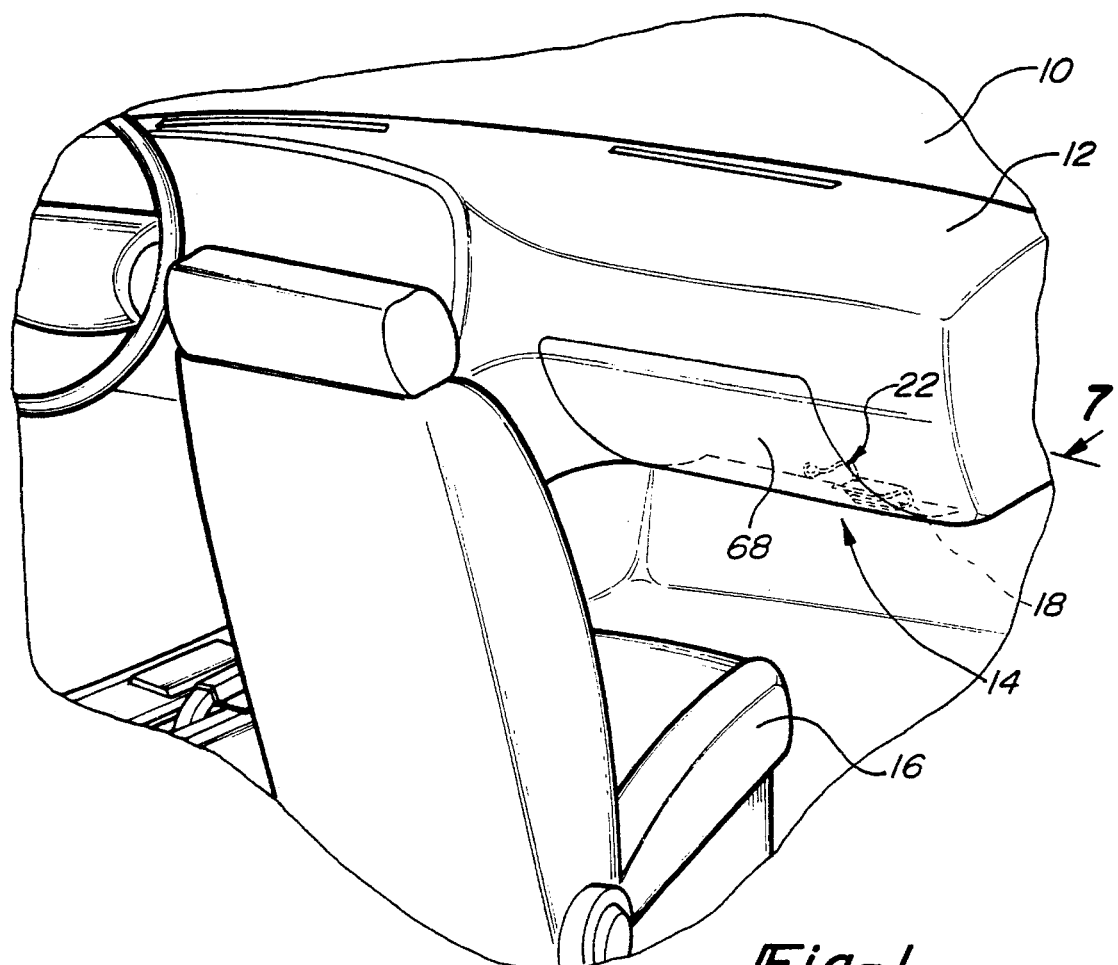
FIG. 1 is a partial perspective view of the interior of an automobile employing the instrument panel assembly of the present invention.
Figure 2:
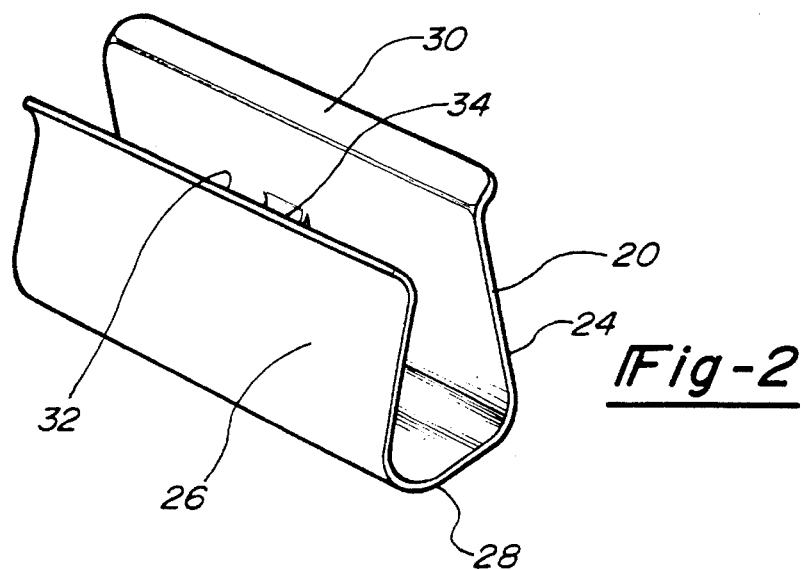
FIG. 2 is a perspective view of the clip member of the present invention.

Turning now to drawings, and in particular to FIG. 1 thereof, an automotive vehicle 10 is illustrated as including an instrument panel 12 having a glove box door assembly indicated generally at 14 mounted therein and arranged in lateral juxtaposition with a seat 16. The glove box door assembly 14 is illustrated as including a damper assembly 18.

As may best be seen in FIG. 3, the damper assembly 18 comprises a clip member 20 and a tether member 22. The clip member 20 is preferably formed from a resilient material, such as spring steel, as a stamping and is fabricated to be generally U-shaped in cross-section and includes a pair of upstanding legs 24, 26 joined by a base wall 28. A pair of entry ramps 30, 32 are formed at the free ends of the upstanding legs 24, 26, respectively. The upstanding leg 24 is illustrated as being straight and generally perpendicular to the wall 28. A locking barb 34 is struck out from the wall 34 for a purpose to be later described. The other upstanding wall 26 is canted or converges toward the wall 24 to function as a spring arm. At one end 36 of the base wall 28, a tab 38 extends. The tab 38 is pierced by an aperture 40 for receiving a portion of the tether 22.

Figure 7:
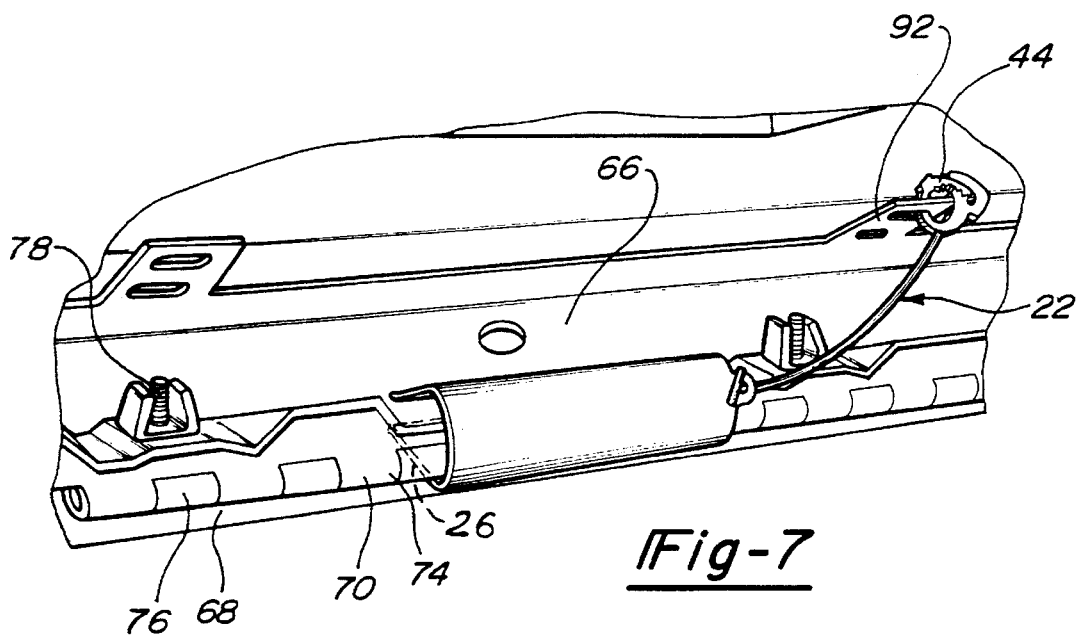
FIG. 7 is a partial perspective view of the inside of the instrument panel assembly of the present invention with the clip and tether installed with the glove box of the instrument panel in an open position.

Tether 22 includes an enlarged end 42 which may be a simple T-section, as may best be seen in FIG. 7, and a locking clamp portion 44 joined by a central strap portion 46 which may have an enlarged cross-section portion 48 formed thereon. The tether is preferably formed from plastic and is integrally molded in the shape shown and best seen in FIG. 3.

The clamp portion 44 includes a pair of jaws 50, 52 joined by a living hinge 54. The jaw 50 includes internally projecting ratchet teeth 54, 56 and the jaw 52 includes outwardly projecting ratchet teeth 58. A channel 60 is formed on the jaw 52 for receiving an arm 62 of the jaw 50 which includes the ratchet teeth 56. Locking clamps of the type shown as the clamp portion 44 are well known in the automotive industry. The precise construction described is not necessary to the practice of the present invention. Other tether mechanisms may be substituted.

Figure 6:
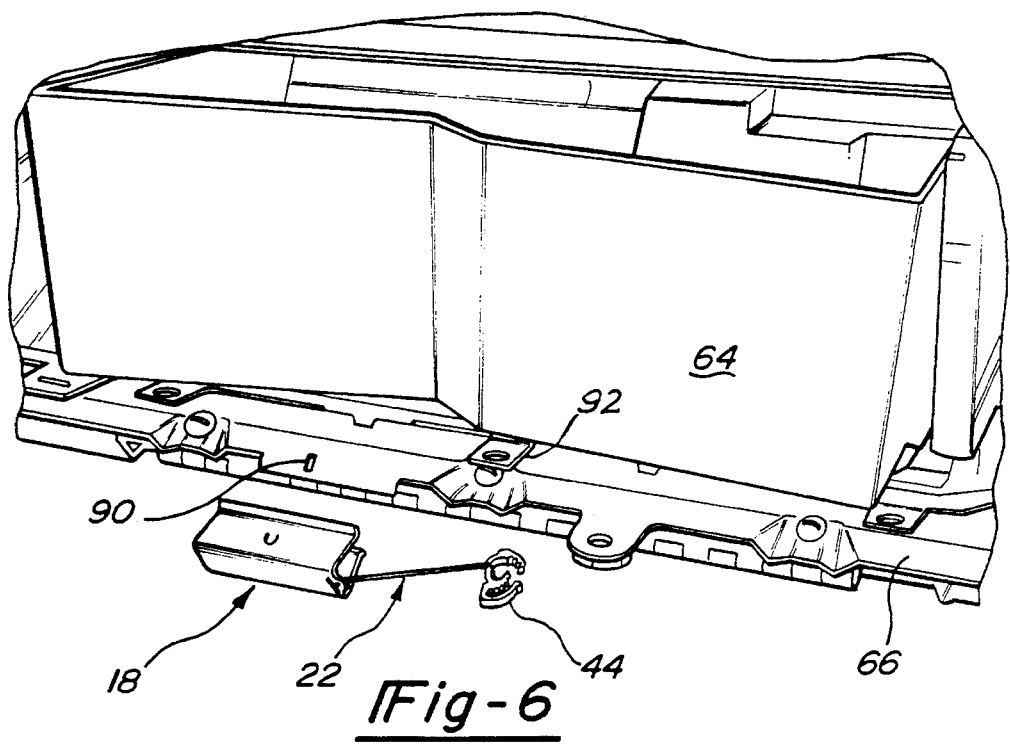
FIG. 6 is a rear perspective view of the instrument panel of the present invention prior to installation of the clip member and tether with the glove box of the instrument panel in the closed position.

Utilization of the damping assembly 18 in the environment of the instrument panel 12 may best be appreciated by reference to FIGS. 5–7. The instrument panel 12 is illustrated as including a glove box 64 mounted in conventional fashion within the instrument panel above a transversely extending reinforcement member 66. The glove box assembly 14 includes a glove box door 68 which is pivotally mounted to the instrument panel 12 through a piano hinge 70. The piano hinge 70 includes mutually pivotable members 74, 76. The member 74 is fixedly secured as by conventional fasteners 78 to the reinforcement member 66. The other member 76 is fixedly secured in a known manner to the glove box door 68.

In order to control the opening movement of a glove box door 68, the damper assembly 18 is slid into clamping engagement with the piano hinge 70 and in the reinforcement member 66. A recess 90 may be included in the reinforcing member 66 to receive the locking barb 34 of the clip member 20. When the clip member 20 is in the fully engaged position shown in FIG. 7, downward pivoting movement of the door 68 is resiliently resisted by the upstanding arm 26 of the clip member 20. This is true because the upstanding arm 24 is loaded fast against the reinforcement member 66 while the upstanding arm 26 spans both the pivotable members 74, 76 of the piano hinge 70. Hence, pivotal opening movement of the glove box door 68 carries the pivotable member 76 downwardly as viewed in FIG. 7 to flex the upstanding arm 26 away from the upstanding arm 24, resiliently resisting movement of the glove box door 68 to which the pivotable member 76 is conventionally attached.

In assembling a vehicle embodying such damping assembly 18, it is desirable to maintain the small simple clip member 20 in close proximity to the glove box assembly 14 throughout the assembly process and during repairs of the vehicle. The tether assembly 22 is utilized to produce this result. As may best be seen in FIG. 7, the clamp portion 44 of the tether assembly 22 is brought into locking engagement with an aperture tab 92.

Only one embodiment of the present invention has been disclosed. Others may be possible without departing from the scope of the appended claims.

What I claim and desire to secure by U.S. Letters Patent is:

1. A door assembly for a glove box in an automotive instrument panel, comprising:

a door mounted for pivotal movement on the instrument panel between a closed position and an open position; and a generally U-shaped clip member operatively engaging the door and the instrument panel and operative to resist movement of the door toward the open position.

2. A door assembly as defined in claim 1, and further comprising an elongated hinge operatively disposed between the door and the instrument panel and wherein the clip member clampingly engages the hinge and the instrument panel.

3. A door assembly as defined in claim 2, and further comprising an elongated reinforcing member carried with the instrument panel and receiving the hinge.

4. A door assembly as defined in claim 1, wherein the clip member includes a pair of upstanding arms joined by a base portion and wherein the arms clampingly engage the door and the instrument panel.

5. A door assembly as defined in claim 3, wherein the clip member includes a pair of upstanding arms joined by a base portion and wherein the arms clampingly engage the door and the instrument panel.

6. A door assembly as defined in claim 5, and further comprising locking barb means formed on the clip member for securing the clip member to the hinge and reinforcing member.

7. A door assembly as defined in claim 1, and further comprising a tether member fixedly secured to the clip member and selectively lockingly engaged with the instrument panel.

8. A door assembly for a glove box in an automotive instrument panel, comprising:

a door;

an instrument panel having an aperture formed therein, the aperture being bounded along a lower edge by an elongated reinforcing member;

a hinge member having one portion fixedly secured to the reinforcing member and one portion fixedly secured to the door, the portions being pivotally movable with respect to each other to move the door between a position closing the aperture and open positions; and a generally U-shaped resilient clip member clampingly engaging the reinforcing member and the hinge to resist movement of the door toward the open position.

9. A door assembly as defined in claim 8, wherein the clip member includes a pair of generally converging upstanding arms joined by a base portion and wherein the arms clampingly engage the reinforcing member and the hinge.

10. A door assembly as defined in claim 5, and further comprising a locking barb means formed on the clip member and a depression formed on the reinforcing member for securing the clip member to the reinforcing member and the hinge.

11. A door assembly for a glove box in an automotive instrument panel, comprising:

a door;

an instrument panel having an aperture formed therein, the aperture being bounded along a lower edge by an elongated reinforcing member;

a hinge member having one portion fixedly secured to the reinforcing member and one portion fixedly secured to the door, the portions being pivotally movable with respect to each other to move the door between a position closing the aperture and open positions;

a generally U-shaped resilient clip member clampingly engaging the reinforcing member and the hinge to resist movement of the door toward the open position; and a tether member fixedly secured to the clip member and selectively lockingly engageable with the reinforcing member.

* * * * *